United States Patent [19]

Mizukawa et al.

[11] Patent Number: 5,381,266
[45] Date of Patent: Jan. 10, 1995

[54] STEREOVIEWER INCLUDING LENSES OF VARYING FOCAL DISTANCE

[75] Inventors: Shigeo Mizukawa; Tsuneo Yokoyama, both of Omiya, Japan

[73] Assignee: Fuji Photo Optical Co., Ltd., Saitama, Japan

[21] Appl. No.: 15,341

[22] Filed: Feb. 9, 1993

Related U.S. Application Data

[62] Division of Ser. No. 813,530, Dec. 26, 1991, Pat. No. 5,218,470.

[30] Foreign Application Priority Data

Jan. 19, 1991 [JP]  Japan .................................. 3-12867
Jan. 19, 1991 [JP]  Japan .................................. 3-12868

[51] Int. Cl.6 .......................... G02B 27/22; G02B 3/10
[52] U.S. Cl. ................................. 359/466; 359/477; 359/720; 359/721
[58] Field of Search ............... 359/466, 467, 473-477, 359/720, 721

[56] References Cited

U.S. PATENT DOCUMENTS

| | | | |
|---|---|---|---|
| 401,807 | 4/1889 | White | 359/473 |
| 749,046 | 11/1904 | Folmer et al. | 359/473 |
| 946,339 | 11/1910 | Crocker et al. | 359/466 |
| 3,010,366 | 11/1961 | Crawford | 359/721 |
| 4,730,898 | 3/1988 | Curtin | 359/466 |

FOREIGN PATENT DOCUMENTS

| | | | |
|---|---|---|---|
| 141867 | 6/1903 | Germany | 359/474 |
| 291633 | 5/1916 | Germany | 359/474 |
| 210658 | 2/1924 | United Kingdom | 359/477 |

*Primary Examiner*—Jon W. Henry
*Attorney, Agent, or Firm*—Townsend & Banta

[57] ABSTRACT

A stereoviewer for observing a stereo pair of photographs three-dimensionally through binocular lenses is shown and described. The stereoviewer comprises a box-shaped main body case having a space for accommodating stereoscopic photographs; a lid for covering the main body case; holder portions provided on one side surface of the box-shaped main body case so as to position and hold the stereoscopic photographs in a non-perpendicular standing state; and binocular lenses provided thereon are inclined in such a manner that the binocular lenses face the vertical center portion of the stereoscopic photographs. This stereoviewer also serves as a package and has a simple structure. The thickness of the binocular lenses are varied so that the focal distance is different between the upper portion and the lower portion of said binocular lenses and the binocular lenses are decentered outwardly in the horizontal direction.

3 Claims, 4 Drawing Sheets

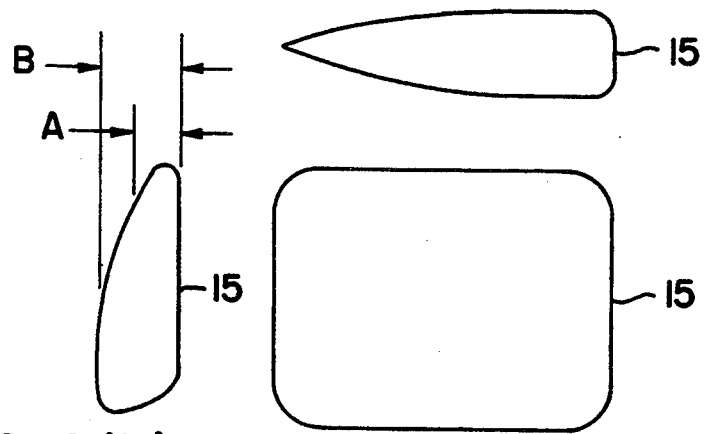
FIG. 6(C)
FIG. 6(B)
FIG. 6(A)
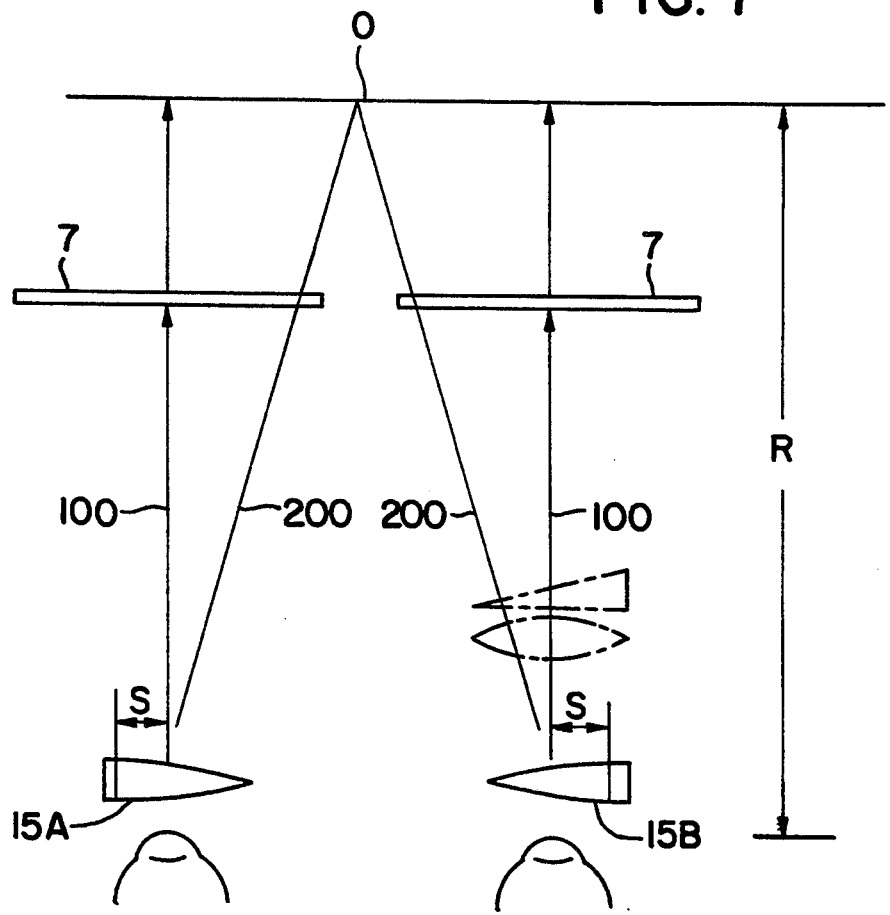
FIG. 7

STEREOVIEWER INCLUDING LENSES OF VARYING FOCAL DISTANCE

CROSS REFERENCE TO A RELATED APPLICATION

This is a divisional application of co-pending application Ser. No. 07/813,530 filed Dec. 26, 1991, now U.S. Pat. No. 5,218,470.

BACKGROUND OF THE INVENTION

1. Field of the Invention

The present invention relates to the structure of a stereoviewer for viewing a pair of stereoscopic photographs three-dimensionally through binocular lenses.

2. Description of the Prior Art

A stereoviewer is an apparatus for viewing a subject three-dimensionally by viewing through binocular lenses a pair of photographs of the same subject which are taken from rightward and leftward points. Such a stereo pair of photographs are taken by a stereoscopic camera equipped with two photographing lenses or by one camera and from rightward and leftward points.

FIG. 8(A) is an external view of a stereoscopic camera. The stereoscopic camera is composed of a main body 1 provided with a finder 2 and a shutter button 3, and two matched photographing lenses 4, 5 provided on the front surface of the main body 1 with an interval of about 70 mm between the two lenses 4, 5. A subject to be taken is positioned through the finder 2 and taken on the film mounted on the main body 5 through the photographing lenses 4, 5 by pressing the shutter button 3. Two images caught from different angles are thus projected on the film.

FIG. 8(B) shows the structure of a conventional simple stereoviewer. A stereo pairs of photographs 7 (hereinunder referred to as "stereoscopic photographs") printed on photographic paper from the film is inserted into a photograph holder 6A. The stereoscopic viewer is provided with binocular lenses 8A, 8B so as to view the stereoscopic photographs 7 therethrough at a least distance (about 25 cm) of distinct vision. By viewing the stereoscopic photographs 7 through the binocular lenses 8A, 8B, it is possible to view the images as a three-dimensional image.

Since the conventional stereoviewer shown in FIG. 8(B) is handled separately from the stereoscopic camera shown in FIG. 8(A), the user cannot view a three-dimensional image immediately after he receives the images printed on photographic paper as the stereoscopic photographs 7, and the user finds it a bother to view the stereoscopic photographs 7 through a stereoviewer. In addition, since the stereoviewer is manufactured separately from the stereoscopic camera, the manufacturing cost separate from that of the stereoscopic camera is charged against the user to his disadvantage.

In the conventional stereoviewer, a convex lens having a constant curvature is used for the binocular lenses 8A, 8B. It is therefore not possible for people of all ages to adjust the focal length of the binocular lenses 8A, 8B. That is, when a person grows old, he becomes farsighted and the image of a substance is formed behind the retina. It is therefore difficult to view the stereoscopic photographs at a least distance of distinct view through the ordinary binocular lenses 8.

When the stereo pair of photographs shown in FIG. 8(B), which are arranged with a predetermined space therebetween, are observed through the binocular lenses 8, the observer recognizes the images on the stereoscopic photographs as a three-dimensional image by superimposing the stereo pair of photographs 7 on each other with the observer's eyes. It is, however, difficult for an observer having the eyes at a narrow distance from each other to superimpose the stereoscopic photographs 7.

SUMMARY OF THE INVENTION

Accordingly, it is a primary object of the present invention to eliminate the above-described problems in the prior art and to provide a stereoviewer and package which facilitates the observation of stereoscopic photographs and which can reduce the manufacturing cost of a stereoviewer.

It is a secondary object of the present invention to provide a stereoviewer which enables people of all ages to view stereoscopic photographs at a least distance of distinct vision.

It is a tertiary object of the present invention to provide a stereoviewer which facilitates the formation of a three-dimensional image irrespective of the distance between the observer's eyes.

To achieve the primary object, there is provided in a first aspect of the present invention a stereoviewer and package comprising: a box-shaped main body case having a space for accommodating stereoscopic photographs; a lid for covering the main body case; holder portions provided on one side surface of the box-shaped main body case so as to position and hold the stereoscopic photographs in a standing state; and binocular lenses provided on the other side surface which is opposite to the holder portions; the side surface with the binocular lenses provided thereon being inclined in such a manner that the binocular lenses are faced the vertically center position of the stereoscopic photographs.

According to this stereoviewer and package, it is possible to accommodate the stereoscopic photographs with subjects printed thereon in the main body case and package them by closing the lid. That is, the main body case and the lid can function as a package. On the other hand, when the lid is removed and the stereoscopic photographs are inserted into the holder portion in a standing state, a three-dimensional image is observed thorough the binocular lenses. That is, the stereoviewer and package serves as a stereoviewer. In addition, since the stereoviewer and package is produced by utilizing a paper package so as to add the function as a package, it is possible to reduce the manufacturing cost of a stereoviewer.

To achieve the secondary object, there is provided in a second aspect of the present invention a stereoviewer equipped with binocular lenses for observing stereoscopic photographs three-dimensionally, wherein the thickness of the binocular lenses is varied so that the focal distance is different between the upper portion and the lower portion of the binocular lenses.

According to this stereoviewer, young people use the upper portion of the binocular lenses so that the images of the stereoscopic photographs are formed on the retinas at a least distance of distinct view in the same way as in the prior art. On the other hand, old people can use the lower portion of the binocular lenses so that the least distance of distinct view is shifted backward and the images of the stereoscopic photographs are formed behind the retinas at the least distance of distinct view.

In this way, people of all ages can observe a three-dimensional image.

To achieve the tertiary object, there is provided in a third aspect of the present invention a stereoviewer equipped with binocular lenses which are decentered outwardly in the horizontal direction. According to this stereoviewer, since the apparent positions of a stereo pair of photographs are shifted toward the extended center line of the observer's eyes, even an observer having the eyes at a narrow distance from each other can easily view the three-dimensional image.

The above and other objects, features and advantages of the present invention will become clear from the following description of the preferred embodiment thereof, taken in conjunction with the accompanying drawings.

BRIEF DESCRIPTION OF THE DRAWINGS

FIGS. 6(A) to 6(C) show the structure of the binocular lenses of the embodiment, wherein FIG. 6(A) is an elevational view, FIG. 6(B) is a side elevational view and FIG. 6(C) is a top view, respectively, thereof;

FIG. 7 shows the embodiment in the state in which the stereoscopic photographs are observed through the binocular lenses.

DESCRIPTION OF THE PREFERRED EMBODIMENT

Figure 1:
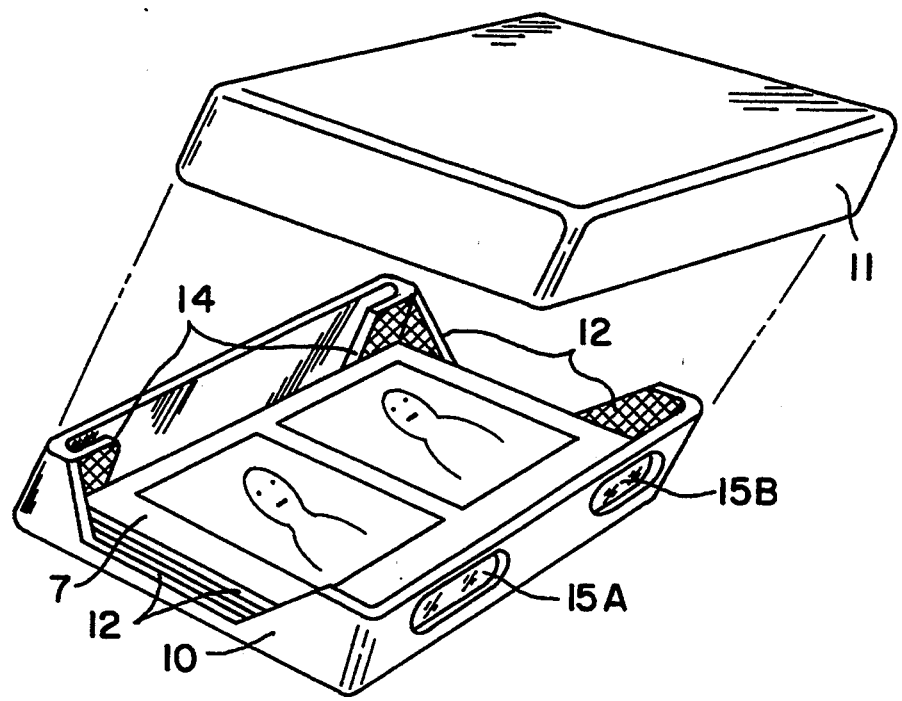
FIG. 1 is a perspective view of the structure of an embodiment of a stereoviewer and package according to the present invention.

Referring first to FIG. 1 which shows the structure of an embodiment of a stereoviewer and package, a box-shaped main body case 10 is made of a paper or plastic material, and it can accommodate plural pairs of stereoscopic photographs 7. The main body case 10 is covered with a lid 11 which is slightly larger than the main body case 10 and made of the same material as that of the case 10. On the right and left side surfaces of the main body case 10, inverted trapezoidal notches 12 are formed so as to facilitate the insertion and the removal of the stereoscopic photographs 7. A reflection preventive film is preferably attached to the inner surface of the main body case 10 (alternatively, a black coating may be applied to the inner surface).

Figure 2:
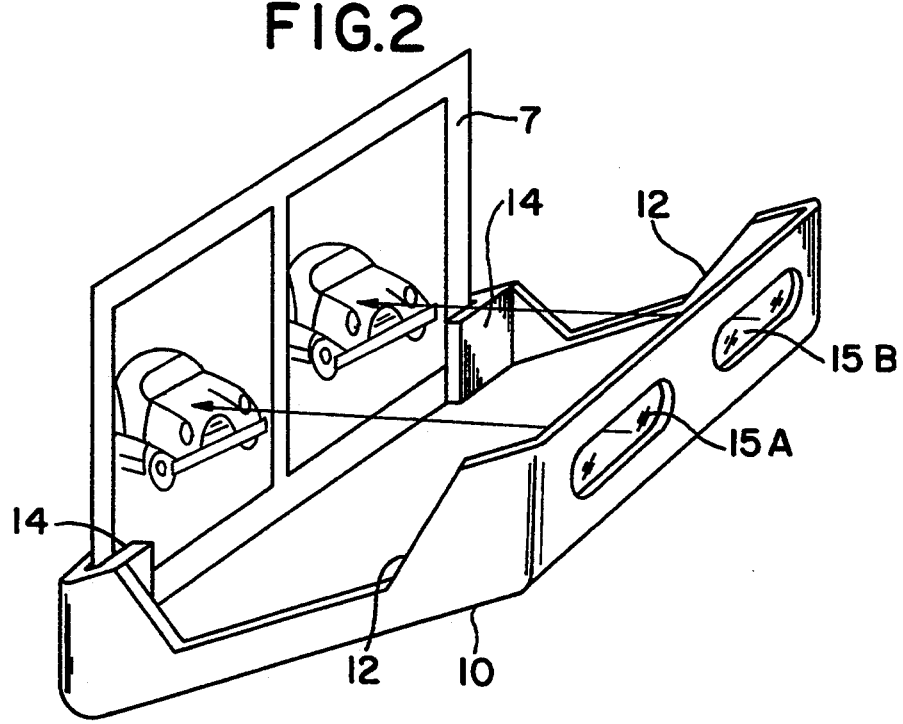
FIG. 2 is a perspective view of the embodiment shown in FIG. 1 which is used as a stereoviewer.

Holder portions 14 for holding the stereoscopic photographs 7 in a standing state are formed on the rear side surface of the main body case 10. The holder portions 14 are composed of projection pieces which are extended from the right and left side surfaces in parallel with the rear side surface. It is thus possible to hold the stereoscopic photographs 7 between the rear side surface of the main body case 10 and the projection pieces of the holder portions as shown in FIG. 2. To the front side surface of the main body case 10 opposite to the rear side surface are attached binocular lenses 15A, 15B of a plastic or glass material that the stereoscopic photographs 7 held by the holder portions 14 are set at a least distance (about 25 cm) of distinct vision.

Figure 3:
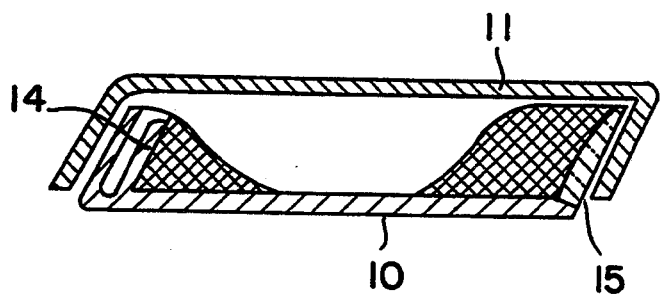
FIG. 3 is a side elevational view of the embodiment shown in FIG. 1 with the main body case covered with the lid.

The front side surface with the binocular lenses 15 provided thereon and the rear side surface with the holder portions 14 provided thereon are not vertical to the bottom surface but inclined at a predetermined angle, as shown in FIG. 3. If the rear side surface is inclined, the position at which the stereoscopic photographs 7 are viewed through the binocular lenses 7 shifts upward. In this embodiment: the front side surface with the binocular lenses 15 provided thereon is inclined until the binocular lenses 15 face the vertically center position of the stereoscopic photographs 7. It is also possible to incline only the front side surface with the binocular lenses 15 provided thereon so as to face the vertically center position of the stereoscopic photographs 7.

Figure 4:
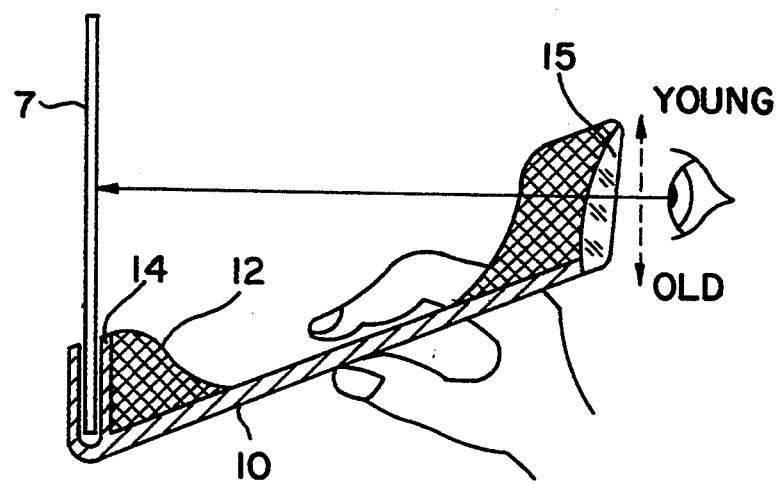
FIG. 4 shows the embodiment in the state in which the stereoscopic photographs are observed through the stereoviewer.
Figure 5:
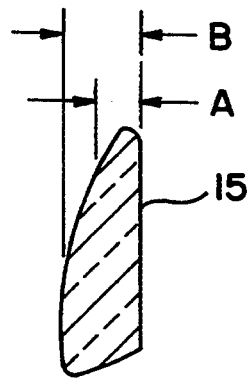
FIG. 5 is a sectional view of the binocular lenses of the embodiment.
Figure 8A:
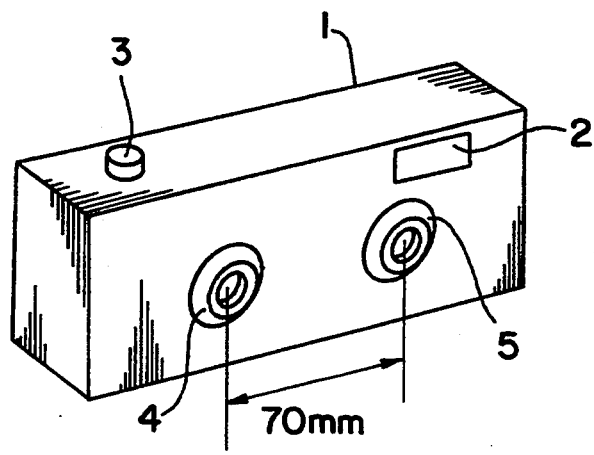
FIGS. 8(A) shows the structure of a conventional stereoscopic camera and FIG. 8(B) shows a conventional stereoviewer.
Figure 8B:
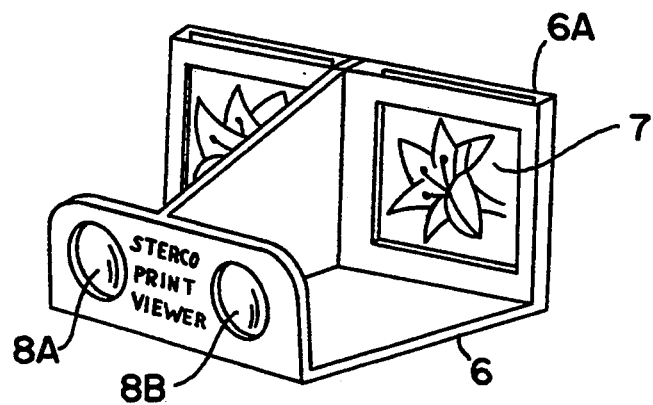

According to the above-described structure, the main body case 19 covered with the lid 11 is used as a package. Stereoscopic photographs finished by a photofinishing laboratory or the like are accommodated in the main body case 10 before they are delivered to the customer. The user of the stereoviewer who has received the package removes the lid 11, takes out a stereo pair of photographs 7 and stands the stereoscopic photographs 7 between the holder portions 14 and the rear side surface, as shown in FIG. 2. In this way, it is possible to view the stereoscopic photographs 7 through the binocular lenses 15, as shown in FIG. 4. It is therefore easy for the user to observe a three-dimensional image without the need for preparing a special stereoviewer exclusively for observing a three-dimensional photograph as in the prior art. In addition, since the stereoviewer of the present invention is made of a paper material so that it also serves as a package, it can be produced at a low cost.

In this embodiment, the lid 11 is simply fitted over the main body case 10, but a retaining mechanism for firmly fixing the lid 11 to the main body case 10 may be provided. Both the front side surface of the main body case 10 with the binocular lenses 15 provided thereon and the binocular lenses 15 may be made of a plastic material. In this case, the step of attaching the binocular lenses 15 is simplified.

It is also possible to make the binocular lenses 15 as a varifocal lens so that the thickness thereof is different between the upper portion and the lower portion, thereby enabling people all ages to focus the binocular lenses 15 on the stereoscopic photographs 7 at a least length of distant vision. In other words, the thickness of the binocular lenses 15 is continuously varied from A cm which sets the least length of distant vision at about 25 cm so as to fit for young people to B cm which sets the least length of distant vision at about 50 cm so as to fit for old people. Therefore, young people can focus the binocular lenses 15 on the stereoscopic photographs 7 at a least distance of distinct vision in the same way as in the prior art by using the upper portion of the binocular lenses 15. On the other hand, old people can use the lower portion of the binocular lenses 15 which form the images on the retinas by moving the focal point of the stereoscopic photographs 7 which are observed at a least distance of distinct vision forwardly. In this way, people of all ages can observe a three-dimensional image of the stereoscopic photographs 7.

In this embodiment, the binocular lenses 15 are decentered in the horizontal direction, as shown in FIG. 6(C). The binocular lenses 15A, 15B are arranged at the positions which are S mm outward of the center lines 100 of the respective stereoscopic photographs 6. This decentering enables not only the stereoscopic photographs 7 to be observed at a least distance R (about 25 cm) of distinct view but also the stereoscopic photographs 7 to be superimposed on the center point of the eyes at the least distance R of distinct view as if the stereoscopic photographs 7 were located in the directions 200. In other words, decentering the binocular lenses 15 substantially produces the state in which a wedge prism is disposed between the stereoscopic photograph 7 and a conventional lens so that the apparent positions of the stereoscopic photographs 7 are moved inwardly. It is therefore made easy to superimpose the stereo pair of photographs 7 on each other, and all people including an observer having the eyes at a narrow distance from each other can easily observe the stereoscopic photographs 7 three-dimensionally.

Although the upper portion of the binocular lenses 15 is made thick and the lower portion thereof is made thin in this embodiment, the thickness of the binocular lenses 15 may be reversed between the upper portion and the lower portion so that the upper portion is for old people and the lower portion for young people. The binocular lenses 15 are applied to a stereoviewer and package in this embodiment, but they may also be applied to various conventional stereoviewers or slide apparatuses for three-dimensional observation.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A stereoviewer comprising binocular lenses for observing stereoscopic photographs three-dimensionally, wherein the thickness of said binocular lenses is varied so that the focal distance is different between the upper portion and the lower portion of said binocular lenses.

2. A stereoviewer according to claim 1, wherein said binocular lenses are decentered outwardly in the horizontal direction.

3. A stereoviewer according to claim 1, further comprising a box-shaped main body case and a lid for covering said main body case, said main body case having a space for accommodating stereoscopic photographs and a holder portion for said binocular stereoscopic photographs, said lenses being provided in a sidewall of said main body case.

* * * * *